(No Model.) 3 Sheets—Sheet 3.
W. CONNELLY.
APPARATUS FOR MANUFACTURING BOILERS.
No. 496,640. Patented May 2, 1893.
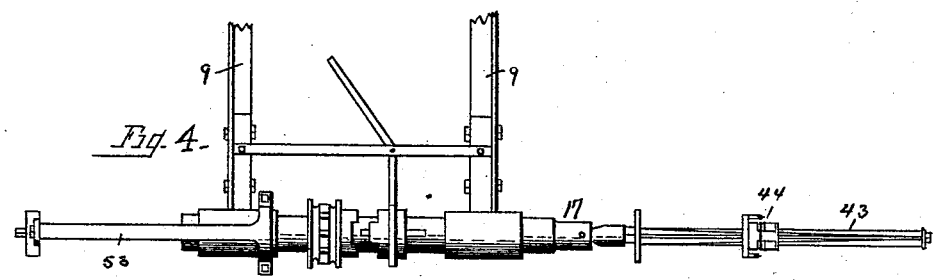
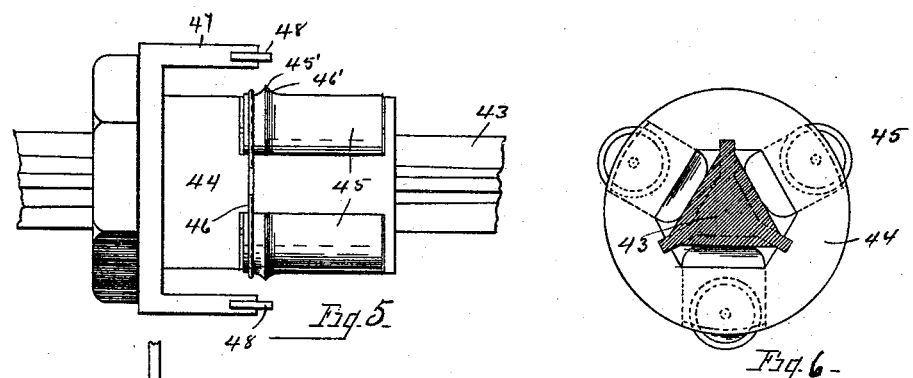
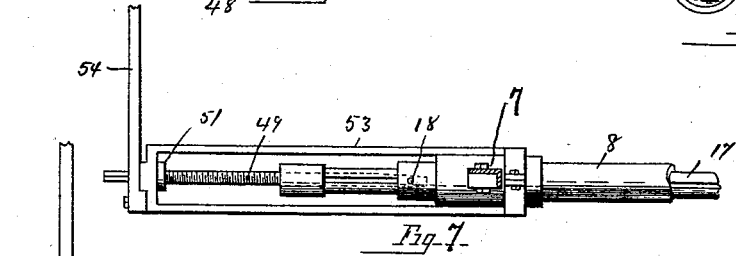
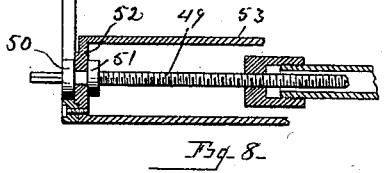
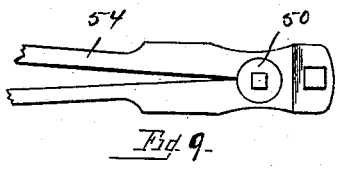
WITNESSES
Carroll J. Webster
G. S. Southard
INVENTOR
William Connelly
By
William Webster
Atty.

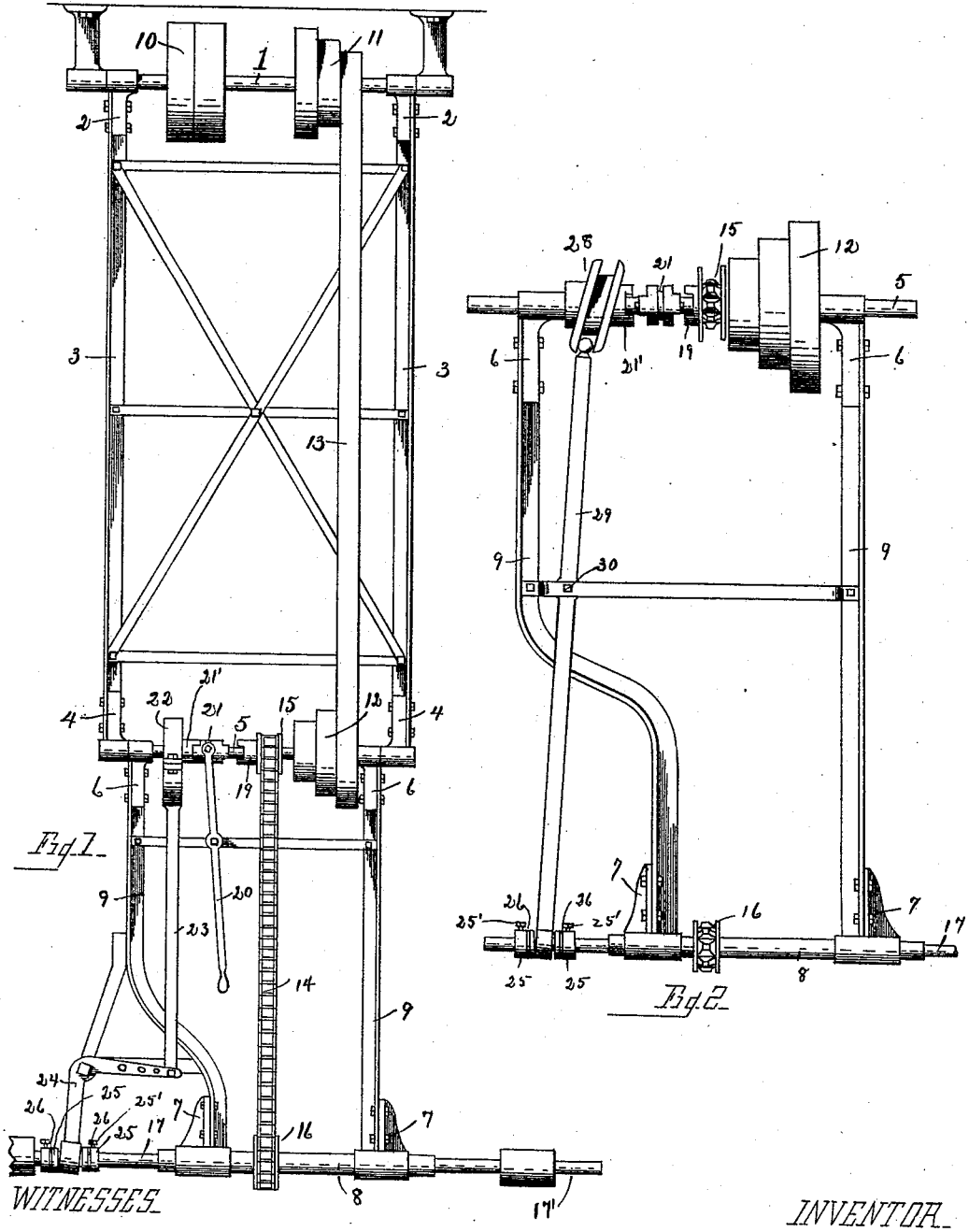

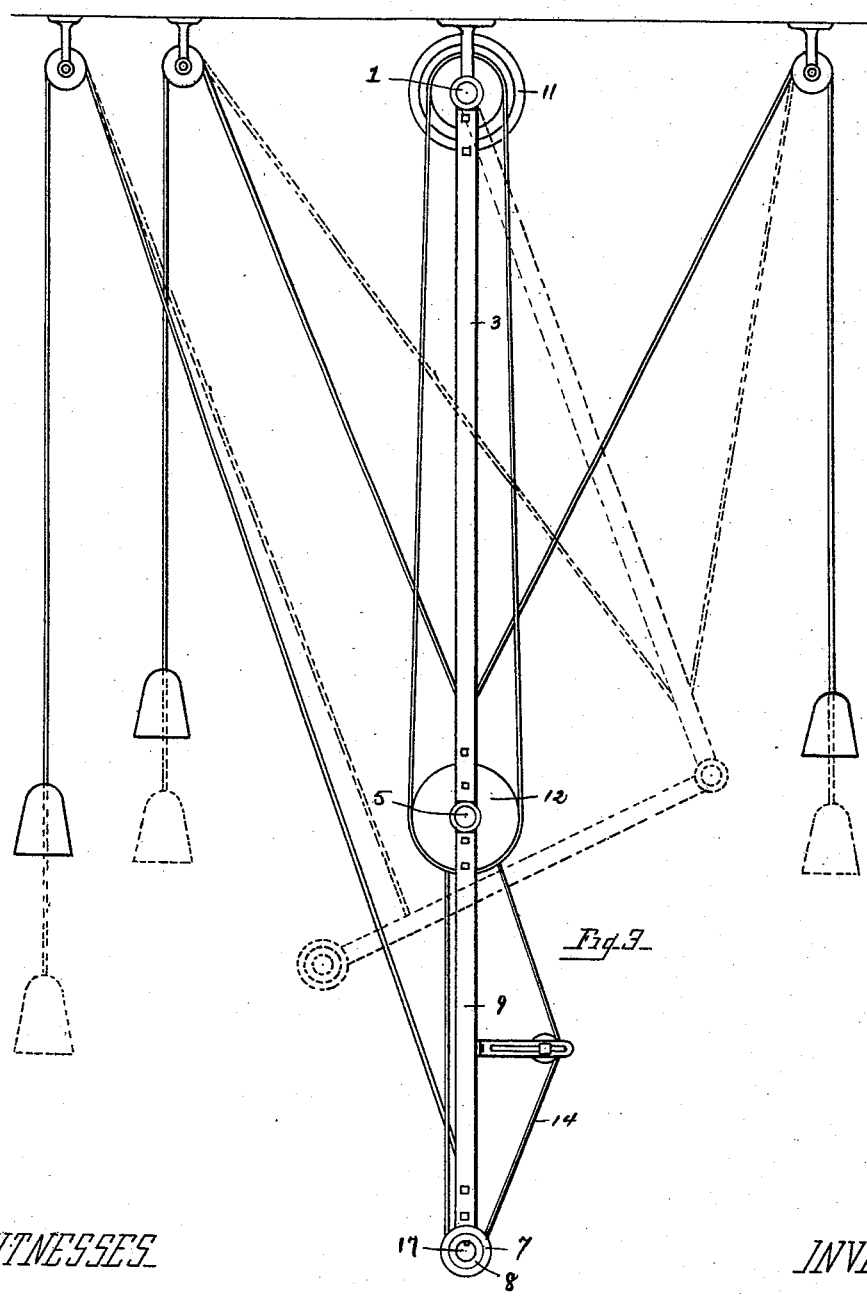

UNITED STATES PATENT OFFICE.

WILLIAM CONNELLY, OF TOLEDO, OHIO.

APPARATUS FOR MANUFACTURING BOILERS.

SPECIFICATION forming part of Letters Patent No. 496,640, dated May 2, 1893.

Application filed August 20, 1891. Serial No. 403,157. (No model.)

*To all whom it may concern:*

Be it known that I, WILLIAM CONNELLY, of Toledo, county of Lucas, and State of Ohio, have invented certain new and useful Improvements in an Apparatus for the Manufacture of Boilers; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to a machine for use in constructing boilers and has for its object to provide a compound mechanism actuated by flexibly driven power shafts, whereby the different movements necessary, may be given to the several tools employed in the construction of a boiler.

Another object is to provide a tool for insertion in the tool holder that shall cut off, expand and bead over the end of the flues at one operation.

Another object is to provide means for leading the tool holder in expanding flues.

Thus it will be seen that the main object of my invention is to cheapen the operation of making boilers by performing the work mechanically.

In the drawings:—Figure 1 is a front elevation of the swinging frame, the leading die and eccentric for working the same being shown, also the manner of communicating power to revolve the die holder and die. Fig. 2 is a like view of the lower section of the swinging frame in which a cam is employed to give a hammer or pounding motion to the leading die. Fig. 3 is a side elevation of the swinging frame and weights for suspending the same the frame in full lines being shown vertical, and in dotted lines swung. Fig. 4 is a front elevation of a section of the frame, the expander, and means for holding the same to the tube. In this view the clutch is shown on the die shaft. Fig. 5 is an enlarged detail view of the flue cutter, expander and header, and Fig. 6 is an end view of the same. Fig. 7 is a detail view showing the head screw and manner of attaching the same to the swinging frame. Fig. 8 is a sectional view of the same, and Fig. 9 is an end view of the same, showing the grips for operating the screw.

1 designates the main shaft suspended in hangers attached to the ceiling, or joists of the building in which the machine is to be operated.

2 designates hangers attached to the shaft to which the angle irons 3 are to be bolted.

4 designates hangers similar to hangers 2 bolted to the lower ends of angle irons 3 and in which a clutch shaft 5 revolves. And on said shaft are hangers 6 which are connected to hangers 7 on a hollow shaft 8, by means of irons 9 which comprise the lower section of the swinging frame.

10 designates a pulley comprising a fast and loose pulley on which is a belt (not shown) by which power is transmitted to shaft 5 through pulleys 11 and 12, by belt 13, and from shaft 5 to shaft 8, through sprocket chain 14 by means of sprocket wheels 15 and 16 respectively.

17 designates the die or tool holder movable longitudinally on shaft 8 and being provided with a key way in which pin 18 in shaft 8 runs.

19 designates a clutch portion integral with the sprocket wheel 15 and loose on shaft 5. Clutch 19 is intended for engagement with the clutch 21 on shaft 5, said clutch 21 being operated by the lever 20. By these means motion is transmitted to the shaft 8.

In Fig. 4 I have shown the clutch on shaft 8, which makes it more convenient for the operator, it being understood that in this instance the clutch on shaft 5 only has one clutch face, to operate the eccentric or cam as the case may be.

22 designates an eccentric loosely mounted on shaft 5 to the strap of which rod 23 is attached on its upper end, the lower end being attached to bell crank lever 24, the opposite end of the bell crank embracing the die holder shaft 17 and rocking against collars 25, of which there are two on shaft 8, each having a rubber packing 26 between them and bell crank lever 24 to cushion the impact. Thus it will be seen, to head the stay bolt or in riveting, lever 20 is thrown over engaging the clutch 21 with the clutch section 21' of the revolving eccentric 22 and causing rod 23 to reciprocate, rocking bell crank lever 24 and causing die holder shaft 17 to reciprocate and cause the holding die 17' to head the bolt or rivet.

In Fig. 2 I have illustrated a movement for heading the bolt or rivet.

28 designates the cam, which operates lever 29, pivoted to the frame at 30, the lower end embracing the die carrying shaft, the operation being the same as with the eccentric.

43 designates a tapered mandrel which is designed to be inserted into the die holder and which carries an expander 44, comprising a body portion carrying rollers 45, moving in a frame the inner ends of which abut against the tapered side of the mandrel and are held in that position by means of the encircling spring 46. Rollers 45 are formed with a sharp ridge 45' and a curve 46' the object of which will be hereinafter described.

47 designates arms carrying rollers 48 which abut against the boiler.

49 designates a lead screw formed with two collars 50 and 51 said collars embracing the end 52 of bifurcated hanger 53 secured to the hanger 7.

54 designates a two-part lever or clamp embracing collars 50 and being attached to the end 52 of the hanger. Thus when it is desired to cut off, expand, and head the flue, the expander is run on the mandrel until the rollers 48 abut against the boiler bringing the ridge 45' inside the flue when levers 54 are pressed holding the lead screw from turning when the screw will cause the die holder shaft and consequently the die to move forward, causing the rollers to expand and revolve on account of the tapering of the die until the ridges pass or cut the flue off, the main portion of the roller expanding the same, and the curved portions 46' bending the end over against the boiler. Thus it will be seen that I have provided a combination tool, comprising a tool holder operating several tools to construct a boiler that can be swung to any point without moving the boiler, the tools being especially formed for the holder and requiring less labor than if the work were done by hand.

It will be understood that when not using the header bolts 25' on collars 25 are loosened leaving the collars loose on the shaft.

What I claim is—

1. In an apparatus for the manufacture of boilers a swinging frame, power transmitting shafts, journaled therein, a shaft carrying a tool-holder, and mechanism connecting the power shafts with the latter shaft, whereby either a rotary or a reciprocatory motion may be imparted thereto.

2. In an apparatus for the manufacture of boilers a main drive-shaft, a swinging frame suspended therefrom, a second shaft carrying an eccentric and a swinging frame, a shaft journaled in the latter frame and carrying a tool holder, and connections between the eccentric and the tool-holder shaft, whereby the latter may be reciprocated by the revolution of the eccentric.

3. In an apparatus for the manufacture of boilers, a main drive-shaft, a swinging frame suspended therefrom, and carrying a clutch shaft, a second swinging frame suspended from the latter shaft, and carrying a hollow shaft in which works a tool-holder, a clutch faced eccentric on the clutch shaft a clutch and a bell-crank and a rod connecting the said eccentric and the tool-holder, whereby, when the clutch is thrown into engagement with the eccentric, the tool-holder will be reciprocated.

4. In an apparatus for the manufacture of boilers, a swinging frame, a power shaft journaled therein, a revolving die holder journaled within one of the shafts and formed with a screw threaded portion, a tapered die in the die holder, a series of expanding rollers journaled in bearings having contact with the die, and a screw rod journaled in a bifurcated hanger one end of the rod being within the screw threaded portion of the die holder, whereby when the hanger is closed the die holder will be caused to move laterally.

In testimony that I claim the foregoing as my own I hereby affix my signature in presence of two witnesses.

WILLIAM CONNELLY.

Witnesses:
WILLIAM WEBSTER,
CARROLL J. WEBSTER.